Nov. 23, 1971    H. L. GILLESPIE    3,621,651
CONNECTOR FOR CHAIN LINKS
Filed Oct. 7, 1969    2 Sheets-Sheet 1

INVENTOR
HERMAN L. GILLESPIE

BY *Jeffers and Young*
ATTORNEYS

Nov. 23, 1971 H. L. GILLESPIE 3,621,651
CONNECTOR FOR CHAIN LINKS
Filed Oct. 7, 1969 2 Sheets-Sheet 2
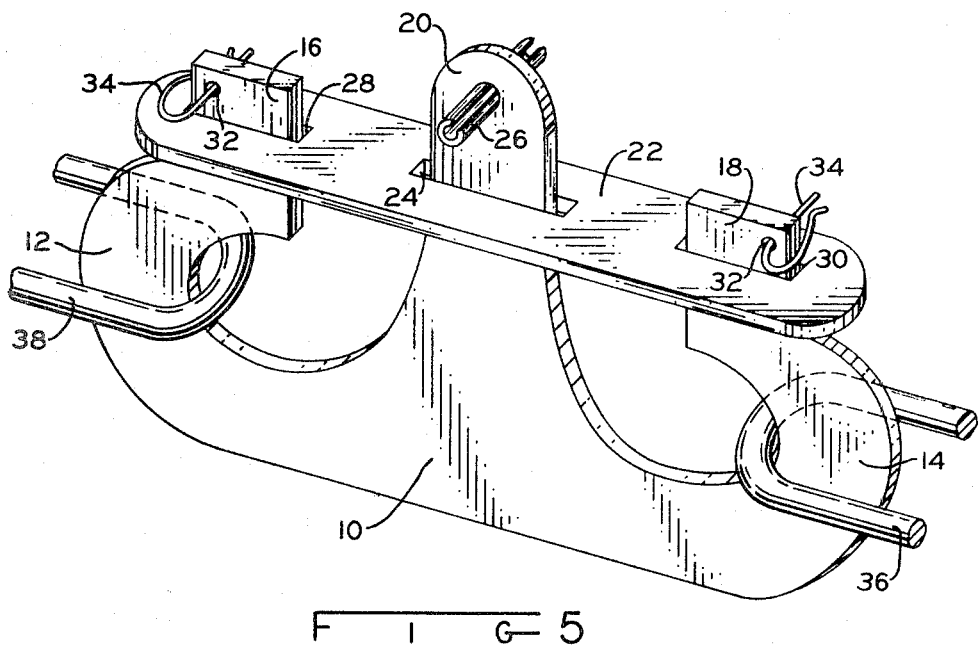
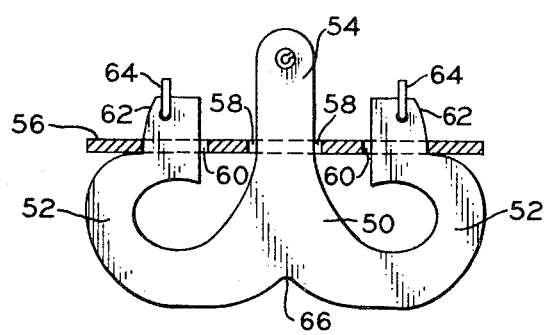
INVENTOR
HERMAN L. GILLESPIE
BY *Jeffers and Young*
ATTORNEYS

United States Patent Office 3,621,651
Patented Nov. 23, 1971

3,621,651
CONNECTOR FOR CHAIN LINKS
Herman L. Gillespie, Fort Wayne, Ind., assignor to Hide-A-Way-Jax, Inc., Fort Wayne, Ind.
Filed Oct. 7, 1969, Ser. No. 864,481
Int. Cl. F16g *13/00*
U.S. Cl. 59—85                                  9 Claims

ABSTRACT OF THE DISCLOSURE

A connector for chains in which a body member is formed, as by stamping, so as to have hooks at the ends opening to the same side of the body member and a projection between the hooks and a keeper moveably captive on the projection. The keeper can be connected to the outer ends of the hooks to confine chain links therein and is releasable from the hooks to permit chain links to be removed from or placed in the hooks.

---

This invention relates to connectors, especially for connecting chain links together.

Connectors are often employed for connecting lengths of chain together and the present invention relates to such a connector, particularly adapted for use in connecting the safety chains of trailers and the like together. Such connectors must be easy to use and should be reliable and capable of sustaining the fairly heavy loads that can be imposed on safety chains in case of accidental uncoupling of the trailer hitch.

Heretofore, no simple, inexpensive simple connector which has been completely reliable in use has been available and the particular object of the present invention is the provision of a connector of this nature.

A further object of the present invention is the provision of a connector of the nature referred to which is easy to manipulate and which can be retained in assembled relation with one chain link while inserting or removing another chain link therefrom.

Another object is the provision of a connector of the nature referred to which is extremely strong and can, therefore, sustain heavy loads.

Another object of this invention is the provision of a connector of the nature referred to which is extremely simple and economical to manufacture.

A still further object of the invention is the provision of a safety connector for a chain which will not accidentally come apart and will stand a heavy strain or load if a trailer hitch becomes unfastened.

The foregoing objects, as well as other objects and advantages of the present invention will become more apparent upon reference to the following detailed specification, taken in connection with the accompanying drawings, in which:

FIG. 4 is a view partly in section of a modified form which a connector according to the present invention can take; and FIG. 5 is a perspective view of a connector according to the present invention.

BRIEF SUMMARY OF THE INVENTION

Figure 1:
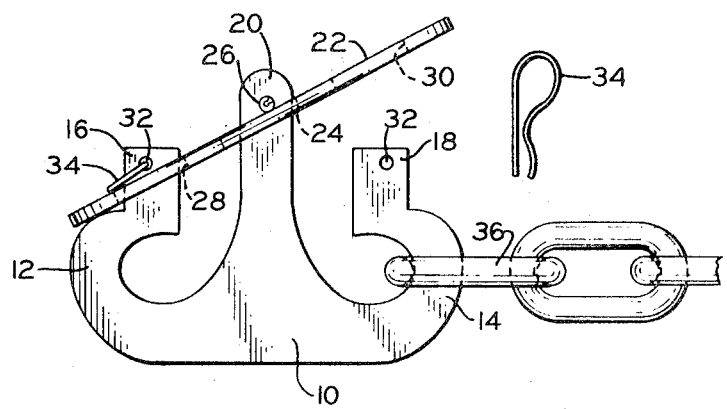
FIG. 1 is a side elevational view of a connector according to the present invention, showing one end closed and the other end open to receive a chain link.

The present invention proposes a connector for chain links in which two longitudinally spaced hook portions are interconnected by a body which has a projection extending outwardly between the free ends of the hook elements. A keeper which is captive on the projection is adapted for engagement with the free ends of the hook elements and when engaged with the hook elements will retain chain links therein.

The keeper, when detached from a hook element, is tiltable to provide a gap through which chain links can be moved in connecting them with and disengaging them from the respective hook element.

The body of the connector and the keeper are preferably in the form of stampings. The keeper may be arranged to sustain loads in tension by making it a close fit on the free ends of the hook elements and, in this manner, strengthens the connector against heavy loads.

DETAILED DESCRIPTION OF THE INVENTION

Referring to the drawings somewhat more in detail, a connector according to the present invention comprises a body member 10 having hook elements 12 and 14 at the opposite ends projecting from the body member in the same lateral direction. The hook elements have the outer free ends 16 and 18 and projecting laterally from body member 10 is a finger-like projection 20 substantially equally spaced from the opposed free ends of the hook elements.

Figure 2:
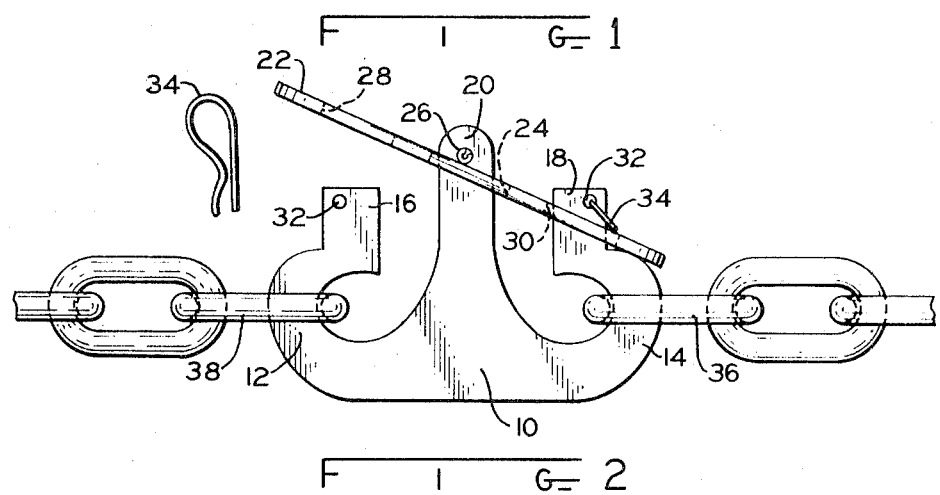
FIG. 2 is a view like FIG. 1, but shows the end of the connector which has received the chain link closed and the other end open to receive a chain link.

A keeper 22 is provided which has a central slot 24 loosely receiving projection 20 so that the keeper can freely tilt on the connector in the plane of the connector body as from its FIG. 1 position to its FIG. 2 position. A keeper element such as a roll pin 26 extending through projection 20 near the outer end holds the keeper 22 captive on projection 20.

Keeper 22 is further provided with a slot 28 engageable with the free end 16 of hook element 12 and a slot 30 engageable with the free end 18 of hook element 14. Each of the free ends of the hook elements is provided with a hole 32 and receivable in these holes are the resilient keeper elements 34.

In operation, the hook element 34 pertaining to the free end 18 of hook element 14 can be removed and keeper 22 tilted to its FIG. 1 position and a chain link 36 engaged with hook element 14. The keeper is then moved downwardly so that free end 18 of hook element 14 passes through slot 30 and the keeper element 34 pertaining to the hook element is replaced in its aperture 32.

Thereafter, keeper element 34 pertaining to the free end 16 of hook element 12 can be removed and keeper 22 tilted up to its FIG. 2 position and in which time link 38 can be engaged with hook element 12. The keeper is then moved downwardly to cause free end 16 of hook element 12 to pass through slot 28 and the keeper 34 pertaining to the said free end is returned to its aperture 32.

Figure 3:
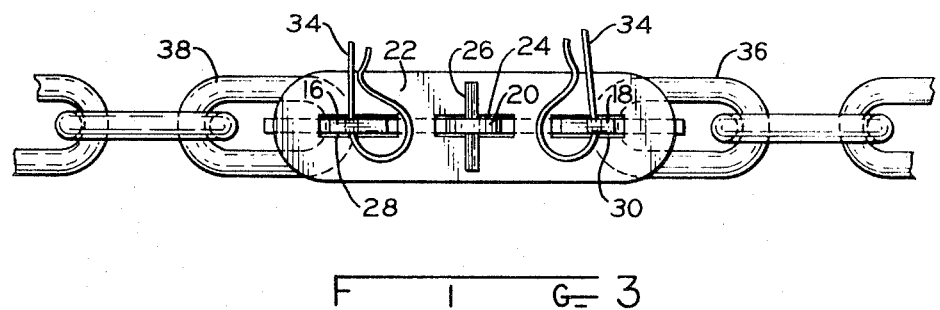
FIG. 3 is a plan view looking down on top of the connector and the ends of the links of chain which it connects.

Both links 36 and 38 are now engaged with their respective hook elements and are held captive therein by keeper 22. The assembly in plan is shown in FIG. 3.

The hook element as described above is quite strong and the hook elements will begin to yield only at high loads imposed thereon. It will be noted that the opposite ends of the hook elements extend substantially in the axial direction and this disposes the material of the connector in the most advantageous manner to sustain the tensile loading placed on the connector member. The exact strength of the connector member will, of course, be determined by the type of material from which it is made and the thickness of the section of the connector. Advantageously, both the connector and keeper are stamped from sheet or strip material and can be made quite economically.

A feature of the present invention is to be found in the fact that the keeper is slotted and fits over the free ends 16 and 18 of the hook elements in such a manner that any substantial yielding of the hook elements away from each other will bring the respective free ends into engagement with the outer ends of the slots provided therefor in keeper 22. This will place the keeper in tension so that it becomes a load bearing structural element under extreme conditions.

In normal operation, the hook elements do not yield far enough to bring the free ends into engagement with the outer ends of the keeper slots, but under extreme conditions this might be the case and the keeper therefor, in addition to preventing the chain links from becoming disengaged from the connector, forms a safety element which will come into play when the connector is heavily loaded, as in the case of an emergency, for example.

FIG. 4 shows a modification in which the keeper is arranged so that it can come into play as a load bearing structural element before the hook elements yield any substantial amount. In FIG. 4, the body of the connector is indicated at 50, and it is provided with hook elements 52 on its opposite ends and a central finger-like projection 54 disposed between the opposed free ends of the hook elements.

The keeper plate is indicated at 56 and it has a central slot 58 loosely receiving projection 54 and end slots 60 receiving the free ends of the hook elements.

In FIG. 4, however, the outer ends of slots 60 engage the outer edges 62 of the free ends of the hook elements and are retained in position thereon by the keeper element 64 which confines the keeper plate on the respective free ends of the hook elements. The edges 62 of the free ends of the hook elements are relieved inwardly toward the center of the connector in the outward direction therealong so that the keeper can be tilted for opening and closing the hook elements without interference from the outer ends of the free ends of the hook elements.

In the FIG. 4 modification, only a slight amount of yielding of hook elements 52, at the most, will commence to apply load to keeper plate 56 so that the FIG. 4 modification represents a particularly advantageous disposition of the material of the connector and keeper plate.

The FIG. 4 modification may include a relieved region at 66 at about the middle of the connector on the side opposite projection 54 which will permit some yielding of hook element 52 without creating objectionable high stresses in the body of the connector, thereby more efficiently transferring a portion of any loading on the connector to the keeper plate 56.

Modifications may be made within the scope of the appended claims.

What is claimed is:

1. A connector, especially adapted for connecting chain links together and comprising, in combination:
    (a) a longitudinal body member having longitudinally spaced hook elements on said body member opening laterally of said body member and concave toward each other,
    (b) each hook element having a free end spaced laterally from said body member,
    (c) lateral projection means on said body member longitudinally spaced from the free ends of said hook element and forming gaps therewith through which chain links can be passed for engagement and disengagement with said hook elements,
    (d) keeper means removably secured to said projection means, and
    (e) said keeper means having outer end parts engageable with the free ends of said hook elements, said end parts being releasable from the respective free ends of said hook elements individually to permit a chain link to be engaged with or released from one hook element while a chain link is retained on the other hook element.

2. A connector according to claim 1, in which said keeper means is a flat bar-like element and has a central longitudinal slot loosely receiving the said projection of said body member so as to be tiltable in the plane of the body member to permit a chain link to be engaged with or released from one hook element while a chain link is retained on the other hook element.

3. A connector according to claim 2, in which said keeper means has longitudinal slots in the end parts thereof for receiving the free ends of said hook elements.

4. A connector according to claim 3, in which said projection on said body member and the free ends of said hook elements include keeper elements for holding said keeper means in engagement therewith, the said keeper elements pertaining to the free ends of said hook elements being removeable therefrom to release the pertaining end part of the said keeper means from engagement with the free end of the respective hook elements.

5. A connector according to claim 4, in which said projection on said body member projects laterally from said body member a greater distance than said hook elements and the keeper element in said portion is near the outer free end thereof whereby said keeper means is tiltable a substantial amount relative to said body member when one end part thereof is released from the free end of the respective hook element.

6. A connector according to claim 4, in which each said hook element is substantially semicircular with the opposite end portions of each hook element extending substantially longitudinally of said body member.

7. A connector according to claim 6, in which said keeper means when engaged with the free ends of said hook elements extends substantially longitudinally of said body member.

8. A connector according to claim 7, in which the ends of the slots in the said end parts of said keeper means which are nearest the ends of the keeper means are substantially the same distance apart as the adjacent edges of said hook elements whereby minimal yielding of the hook elements away from each other will place said keeper means in tension.

9. A connector according to claim 8, in which said hook elements in the region thereof facing away from each other and extending through the slots in said keeper means are relieved to permit the keeper means to tilt about one hook element during engagement and disengagement thereof with the other hook element.

References Cited

UNITED STATES PATENTS

| | | | |
|---|---|---|---|
| 578,211 | 3/1897 | Clark | 24—241 R |
| 1,344,778 | 6/1920 | Tomlin | 24—241 R |
| 1,650,715 | 11/1927 | Hildebrandt | 24—73 R |
| 2,361,069 | 10/1944 | Steinhardt | 70—456 B |
| 3,331,109 | 7/1967 | MacMillan | 24—241 P |
| 3,340,580 | 9/1967 | Wilson | 24—241 SB |
| 1,380,903 | 6/1921 | Haughwout | 59—85 |
| 1,966,665 | 7/1934 | Gourley | 59—93 |
| 2,457,435 | 12/1948 | Beckman | 59—93 |
| 3,027,615 | 4/1962 | Forney | 24—116 |

FOREIGN PATENTS

| | | |
|---|---|---|
| 645,457 | 11/1950 | Great Britain. |
| 808,017 | 1/1959 | Great Britain. |
| 100,269 | 7/1962 | Norway. |

CHARLES W. LANHAM, Primary Examiner

G. P. CROSBY, Assistant Examiner

U.S. Cl. X.R.

24—241 CH; 59—93